United States Patent [19]

Bonafous

[11] 4,194,749
[45] Mar. 25, 1980

[54] SEALING RING

[75] Inventor: Maurice J. Bonafous, Oloron, France

[73] Assignee: Applications Mecaniques et Robinetterie Industrielle, Paris, France

[21] Appl. No.: 927,996

[22] Filed: Jul. 26, 1978

[30] Foreign Application Priority Data

Jul. 26, 1977 [FR] France ................... 77 22976

[51] Int. Cl.² ............................................. F16J 15/32
[52] U.S. Cl. ....................... 277/163; 277/167.5; 251/306
[58] Field of Search ................... 251/306, 305, 307; 277/152, 153, 157, 236, 163, 167.5

[56] References Cited

U.S. PATENT DOCUMENTS

| 3,031,213 | 4/1962 | Bruning et al. | 277/157 |
| 3,053,543 | 9/1962 | Kallin | 251/306 |
| 3,356,336 | 12/1967 | Maenaka | 251/306 |
| 3,879,043 | 4/1975 | Tozer | 277/163 |
| 3,905,577 | 9/1975 | Karpenko | 251/306 |
| 3,917,294 | 11/1975 | Abbes | 277/236 |
| 4,132,399 | 1/1979 | Lelhanu | 277/157 |

Primary Examiner—Robert I. Smith
Attorney, Agent, or Firm—Scully, Scott, Murphy & Presser

[57] ABSTRACT

A double toric sealing ring for providing a seal between a casing and a butterfly member of a butterfly valve is formed with two helical springs each forming a torus and disposed concentrically. The helical spring forming the outer torus has a coil diameter greater than that of the coils of the spring forming the inner torus. Each spring is enclosed by a respective sheath. A metal annulus extending between the tori has its radially inner and outer peripheries bent around the respective sheathed tori. The radially extending portion of the annulus between these bent parts is formed with a bellows like groove concentric with the tori, to permit deformation of the sealing ring which in use is mounted in the butterfly valve so that the smaller diameter encased torus provides a seal between relatively stationary parts and the larger diameter encased torus provides a seal between the casing and the movable butterfly member when the latter is closed.

12 Claims, 5 Drawing Figures

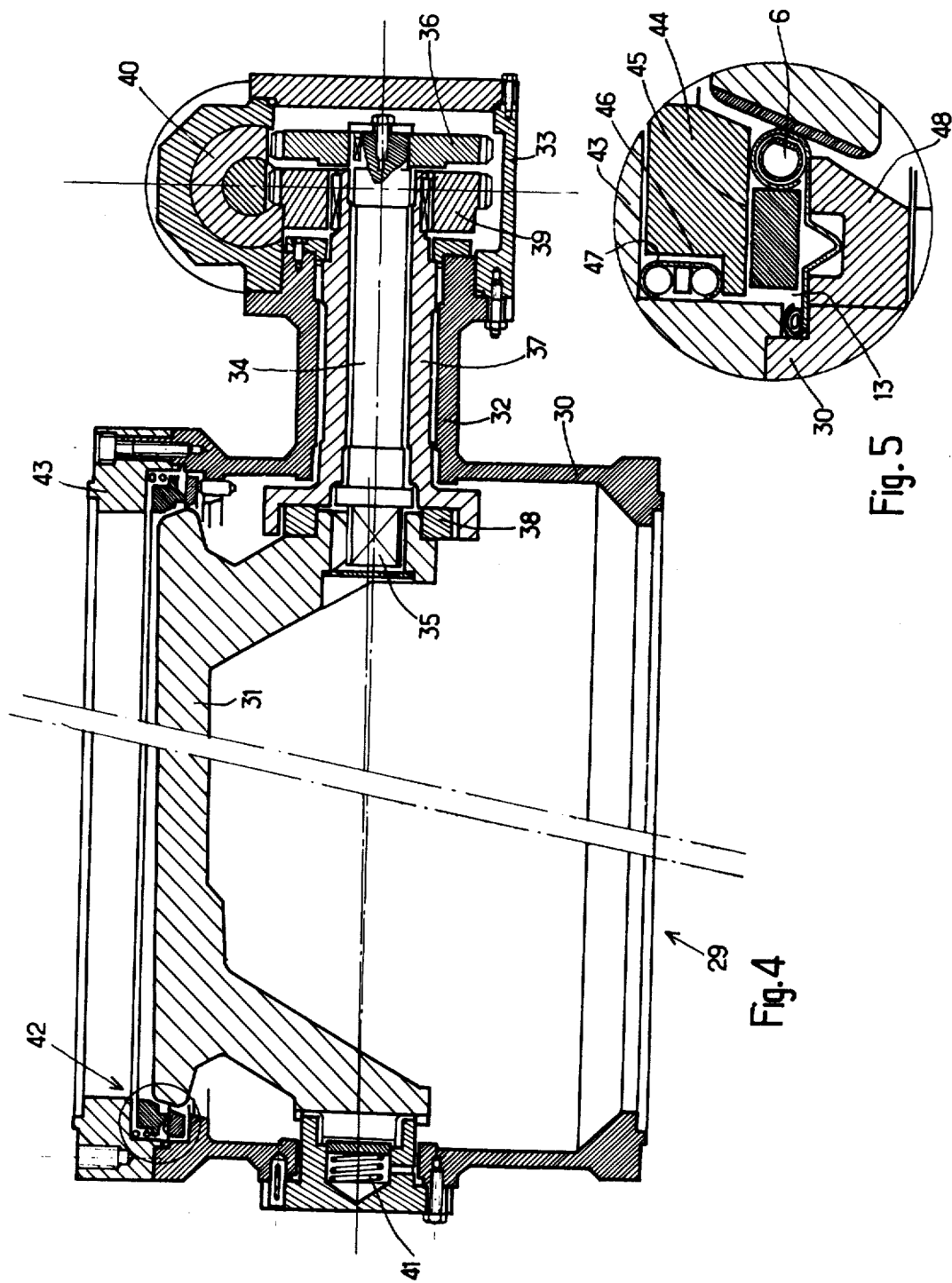

SEALING RING

The present invention relates to a flexible double toric sealing ring, in particular for a shut-off device comprising a closure member cooperating with a seat for the purpose of producing an upstream/downstream seal.

The invention relates preferably, but not necessarily, to the production of shut-off devices such as valves or flat valves in which the closure member comprises a peripheral rim which comes to bear on the conoid surface of a seat at the end of the closure travel and after a movement that is tangential to or parallel to the main axis of symmetry of said seat. The term conoid or conoid of revolution is intended to mean a surface of revolution whose generatrix is any curve.

To obtain a good seal, a conventional solution consists of providing on said peripheral rim, or on said conoid surface, a coaxial annular groove retaining a toric sealing ring. Thus, in the closed position of the closure member, the toric sealing ring is compressed between said peripheral rim, or the conoid surface and the bottom of the groove and thus ensures the seal.

However, an arrangement of this type has a serious drawback. If the closure member is not centred in a suitable manner with respect to the seat, in the closed position, the sealing ring is not compressed uniformly on its periphery, such that the seal is not homogeneous around a closure member. In the parts where the sealing ring is compressed considerably, the closure member is able to withstand considerable pressures, whereas in the parts diametrically opposed to the latter, the seal is suspect and the danger of high-pressure leakages is considerable.

To overcome these drawbacks, it has been considered equipping the closure members of this type with mechanisms for centering the closure member with the respective seat and which involve either the kinamatics of the closure member, or the seat itself.

However, these solutions are complicated, unreliable and involve a considerable increase in the cost price of the shut-off devices.

The invention therefore intends to eliminate these drawbacks. To this end, instead of providing a centering system associated with the shut-off device and/or with its seat, it proposes a toric sealing ring making it possible both to obtain a good upstream/downstream seal and self centering of the sealing ring, however with good homogeniety of the sealing pressure exerted, either on the peripheral rim of the shut-off device, or on the conoid surface of the seat.

The invention also intends to improve the two types of seal produced by conventional toric sealing rings, namely the seal between the sealing ring and the base of its housing and the seal between the sealing ring and the contact surface associated therewith. As regards the seal between the sealing ring and the base of its housing, it provides an independent static seal and this is by means of a conventional sealing ring structure, consequently a reliable and safe seal.

On the other hand, as regards the seal between the sealing ring and its contact surface, it provides a dynamic seal and this is by means of a second moveable sealing ring structure, retained by a counter ring located opposite the sealing surface, the arrangement formed by the second structure and the counter ring being able to move inside the housing and being biased elastically in order to ensure the flexibility of the self centering facilitated in this way.

The two sealing ring structures are interconnected by a sealed and deformable connection in order to ensure the continuity of the seal between these two structures, whilst keeping them mechanically independent of each other.

Thus, according to a feature of the invention, the double sealing ring, with self centering of the latter and which is mounted in a housing whereof the base is constructed in order to be able to cooperate with a toric sealing ring of conventional structure, for the purpose of obtaining a static seal, essentially comprises;

a first toric sealing ring structure comprising an elastically yieldable core, consisting for example of a spring of flexible material, said core being covered at least partly, in succession by a primary casing and by a sealing casing, this first structure ensuring the said static seal with the said base;

a second toric sealing ring structure, able to move inside the housing and also comprising, in a similar manner, an elastically yieldable core, a primary casing and a sealing casing, the two said sealing casings being formed in one piece and being interconnected by a membrane ensuring the continuity of the seal, between the two sealing ring structures;

a counter ring, able to move inside the housing and coming into contact with the second sealing surface, in facing relationship with said sealing surface.

an elastically yieldable member opposing the action of the sealing surface on the second sealing ring structure, this elastically yieldable member being able to consist of said membrane, in the case where the latter is sufficiently elastic and has a suitable construction.

The invention also relates to the application of the sealing ring as aforedescribed, to the production of a shut-off device such as a valve or butterfly valve.

Embodiments of the invention will be described hereafter, as nonlimiting examples, with reference to the accompanying drawings in which;

FIG. 4 is a sectional view of a butterfly; valve in which the double sealing ring is mounted in the body according to another embodiment of the invention;

FIG. 5 is a partial sectional view to an enlarged scale, of the detailed C of FIG. 4.

Figure 1:
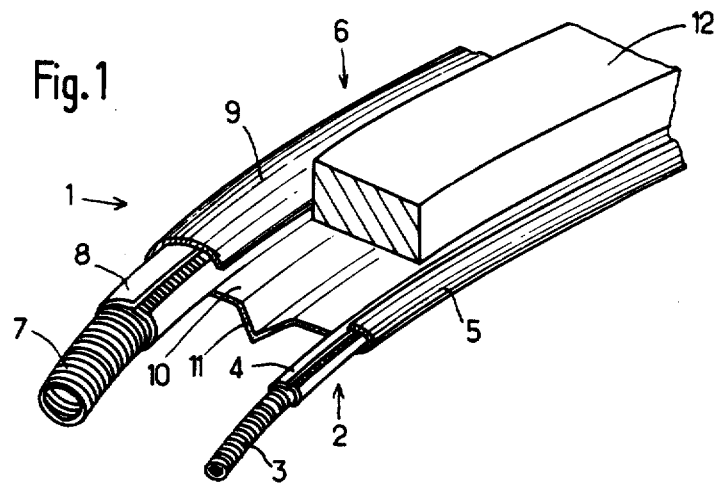
FIG. 1 is a diagrammatic perspective view, with parts cut away, of part of a double sealing ring according to the invention.

With reference to FIG. 1, the double sealing ring 1 essentially comprises two flexible toric sealing ring structures, namely;

a first toric sealing ring structure 2 comprising a helical spring 3 at least partly covered by a primary casing 4 having a substantially circular section, which is itself partly covered by a sealing casing 5, this first toric sealing ring structure 2 being intended to ensure a static seal;

a second toric sealing ring structure 6 whose diameter is generally greater than that of the first sealing ring structure 2 and comprising, in a similar manner, a helical spring 7 at least partly covered by a primary casing 8, having a substantially circular section, which is itself partly covered by a sealing casing 9.

The sealing casings 5,9 of the two sealing ring structures 2 and 6 are constituted by one and the same part, which is made of metal for example, comprising a radial sealing membrane 10 therebetween, which firstly makes it possible to ensure continuity of the seal between the two sealing ring structures 2 and 6 and secondly to fulfill the function of an elastically yieldable member ensuring flexibility of the self centering of the sealing ring structure 6.

More precisely, this toric part (5,9 and 10) has a section of revolution of general C shape, the ends of which respectively fold around said primary casings 4 and 8, whereof the core (membrane 10) comprises one or more V-shape folds 11 in order to provide an elastic connection between the two sealing ring structures 2 and 6.

The double sealing ring 1 also comprises a floating counter ring 12, extending between the two sealing ring structures 2 and 6 substantially against the membrane 10 and pressing against the side of the sealing casing 9 of the sealing ring structure 6 located on the inside of the C. Thus, the sealing ring structure 6 is retained on the side opposed to that where it comes into contact with the sealing part associated therewith, by the counter ring 12, however, the arrangement of the structure 6 and counter ring 12 being able to move together, without appreciable deformation, in order to be self centered on the sealing surface.

Figure 2:
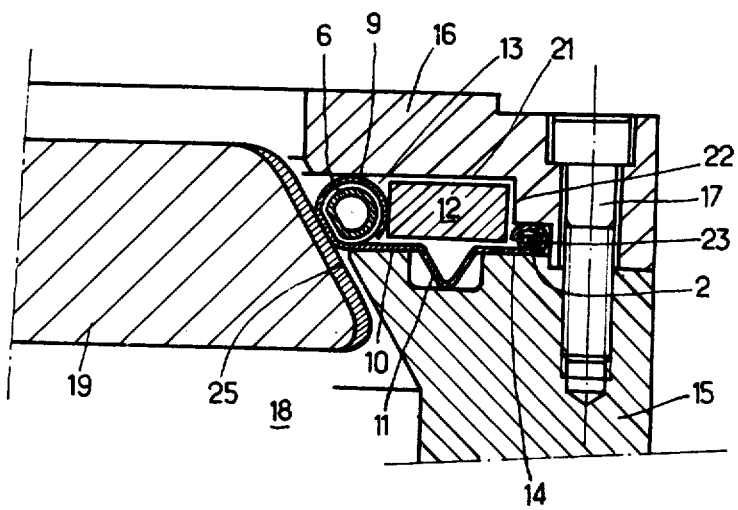
FIG. 2 is a partial sectional view of a butterfly valve in which the double sealing ring according to the invention is supported by the body of the valve.

With reference to FIG. 2, the double sealing ring 1 is located in an annular cavity 13 formed between the side face 14 of the body 15 of a butterfly valve and a flange 16 fixed to said side 14 by means of bolts 17. This cavity 13 opens into the inner chamber 18 of the valve body 15 under its flange 16 and inside which the closure member 19 is able to move. This closure member 19 consists of a butterfly member able to pivot inside the body 18 of the valve and to move by axial translation, at the end of the closure travel.

More precisely, the annular cavity 13 has a cross-section of substantially rectangular shape extending radially and the width of which is substantially equal to the diameter of the sealing casing 9 of the sealing ring structure 6. The upper side face 21 and the base 22 of this cavity are formed by a stepped bore in the flange 16, whereas the lower side face is formed by the side face 14 of the body 15 of the valve.

Provided in the base 22 of the cavity 13 is an annular groove 23 of substantially rectangular section, formed by a step of the bore in the flange 16 and by the side face 14 of the valve body 15.

Mounted in this annular groove 23 is the toric sealing ring structure 2 intended to obtain the said static seal and the diameter of which is greater than that of said groove 23. It should be noted that the mounting of the sealing ring structure 2 takes place at the time of assembly of the flange 16, the sealing pressure being obtained by tightening the flange 16 on the valve body 15.

Provided on the lower side face of the annular cavity (side 14) is a circular recess of rectangular section 24, in which the V shape fold 11 of the sealing membrane 10 is located.

Mounted to float in the space between the base 22 of the annular cavity 13, its upper side 21, the sealing ring structure 6 and the membrane 10 is the counter ring 12, of rectangular section, which is guarded by said upper side 21 and by said membrane 10 at right angles to the axis of the double sealing ring 1.

The dynamic sealing ring structure 6 has a (toric) diameter slightly less than the inner diameter of the body 15 in the region of the housing 13 and then the mean diameter of the conoid edge 25 of the butterfly member 19, such that this sealing ring structure 6 projects slightly inside the inner space of the body 15 and that in the closed position (position shown in FIG. 2) it is compressed between the counter ring 12 and the conoid edge 25 of the butterfly member 19.

It is obvious that according to this arrangement, the conoid edge 25 of the butterfly member 19 and the first and second sealing ring structures 2 and 6 cannot be absolutely concentric, owing to the fact that during closure, self centering of the sealing ring structure 6 about the conical edge 25 of the butterfly member takes place.

In fact, in a valve of this type, closure takes place due to an axial movement of the butterfly member 19 in the direction of the sealing ring 1 and parallel to the latter, such that the dynamic sealing ring structure 6 is biased towards part of the edge 25 of the butterfly member 19 of larger diameter.

Consequently if, when inoperative, the sealing ring structure 6 is not appropriately centred on the edge 25 of the butterfly member 19, the contact of said edge 25 with said sealing ring structure 6 initially occurrs in a region of the edge 25 having a diameter less than that of the said structure 6. Consequently, the latter is pushed sideways with the counter ring 12 until the region of contact of the edge 25 becomes coaxial with the inner region of the structure 6. At this instant, the structure 6 bears over the entire circumference of the butterfly member. In the last stage of the closing movement of the butterfly member 19, still owing to its conoidal shape, the edge 25 compresses the sealing ring structure, which is retained, in the region of its diametrically opposed side, by the counter ring 12. Continuity of the sealing pressure exerted on the sealing ring structure 6 is thus obtained, even if, initially, the edge 25 of the butterfly member 19 and the two sealing ring structures 2 and 6 were not absolutely concentric.

Figure 3:
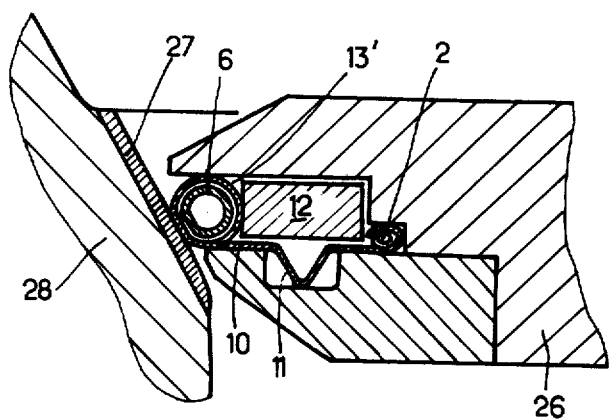
FIG. 3 is a partial sectional view of a butterfly valve in which the double sealing ring according to the invention is supported by the butterfly.

FIG. 3 shows a reverse assembly with regard to that shown in FIG. 2 in the sense that the double sealing ring 1 is supported by the butterfly member 26 of the valve, whereas the sealing surface associated with this double sealing ring 1 consists of a conoidal seat 27 provided inside the body 28 of the valve.

Thus, in the region of its edge, the butterfly member 26 thus comprises an annular cavity 13 tip, the shape of which is absolutely identical to that shown in FIG. 2 and which contains the double sealing ring 1 in the manner aforedescribed.

With reference to FIG. 4, the butterfly valve 29 in which the butterfly member is able to move in two ways, comprises a body 20 in which the butterfly member 31 is located. This body 30 may comprise an extension shaft 32, surmounted by a control box 33 in which is housed an actuating device controlled by a hand wheel and/or by an actuator which is not shown.

Pivotally mounted inside the extension shaft 32 is a central shaft 34 connected at one end to the butterfly member 31 by means of a connecting device 35 facilitating its rotation, however with the possibility of translatory movement and, at the other end, to a driving ring 36 located inside the box 33.

Pivotally mounted around the shaft 34, inside the extension 32, is a coaxial hollow shaft 37, connected at one end to the butterfly member 31 by means of an eccentric 38 facilitating the translatory drive of said butterfly member 31 and at the other end to a driving ring 39 inside the box 33.

The rings 36 and 39 are themselves connected to an appropriate drive system 40, such that by causing the shafts 34 and 37 to pivot in synchronism, the butterfly member 31 is set in rotation, whereas, when the hollow shaft 37 is pivoted, by keeping the shaft 34 stationary, a translatory movement of the butterfly member 31 is produced.

In principle, this translatory movement takes place only when the butterfly member 31 is parallel to the plane of its seat.

Naturally, to facilitate the two said movements (translation, rotation), the butterfly member 31 is also pivotally mounted on the body 30, on the side diametrically opposed to the shaft 37, by means of a pivotal arrangement 41 facilitating two perpendicular rotations.

The aforedescribed valve is referred to as "didromic" by its designer.

With reference to FIGS. 4 and 5, the seat 42 of the butterfly valve, of a type similar to that illustrated in FIG. 2, also comprises, associated with the flange 43, a floating sealing ring support 44 whose lower side 45 constitutes the upper wall of the cavity 13 serving for guiding the dynamic sealing ring structure 6 of the double sealing ring 1, whereas the rear side 46 co-operates with a double sealing ring 47 retained by the flange 43. Furthermore, in its lower part, the seat 42 comprises a ram 48, whose upper side constitutes the lower wall of the cavity 13. This arrangement allows greater freedom of the dynamic sealing ring structure 6, particularly during its movements in the course of self centering on the butterfly member.

I claim:

1. A double toric sealing ring for sealing against a sealing surface and being self centering with respect thereto, and also functioning to obtain a static seal with respect to the base of a housing, comprising:
   a. a first toric sealing ring structure for obtaining a static seal with respect to said base of the housing;
   b. a second toric sealing ring structure for sealing against the sealing surface;
   c. a sealed and elastically deformable structure mounting said first toric sealing ring on one side against said base housing and resiliently mounting said second toric sealing ring on a second side, with said first and second sealing rings being mounted substantially coaxially, such that the resilient mounting of said second toric sealing ring enables it to be self-centering with respect to the sealing surface.

2. A double toric sealing ring according to claim 1, including a counter ring flotably mounted around said sealed deformable structure to allow the sealing ring to be self-centering and achieve a dynamic seal with the second toric sealing ring structure.

3. A double sealing ring according to claim 1 in which said first toric sealing ring structure comprises an elastically yieldable core and a primary casing therefor, said second toric sealing ring structure comprises an elastically yieldable core and a primary casing therefor, and said sealed deformable structure includes a sealing membrane interconnecting said first and second toric sealing ring structure in a unitary manner.

4. A double sealing ring according to claim 1 or 3, said sealed and elastically deformable structure is constructed from a sufficiently elastic material to enable it to function in the manner of a spring.

5. A double sealing ring according to claim 3, said casings and said membrane being formed in the shape of a toric part whose section of revolution has a general C shape, the ends of which wrap around the primary casings for the two sealing ring structures, and wherein the membrane has a V shaped fold.

6. A double sealing ring according to claim 1 or 3, constructed completely of metal.

7. A double sealing ring according to claim 5, located in an annular cavity having a cross-section of substantially rectangular shape, extending radially and the width of which is substantially equal to the diameter of the sealing casing of the second sealing ring structure, the base of this cavity comprising an annular groove in which the said first sealing ring structure is force-fitted, and the lower side of the annular cavity comprising a circular recess in which the V shaped fold of the said sealing membrane is located.

8. A double sealing ring according to claim 7, said cavity being made in at least two parts, connected one to the other.

9. A shut-off device comprising a closure member whereof the peripheral rim comes to bear, at the end of the closure movement, on a sealing surface, which is preferably conical, of a seat and this is after a movement tangential to or coaxial to the main axis of symmetry of said seat, said closure member or said seat comprising a circular housing inside which a double sealing ring according to claims 1 or 3 is located.

10. A butterfly valve whose butterfly member comes to bear at the end of the closing movement, by its edge, on a seat, at the end of a pivotal movement through 90° which brings it parallel to the plane of said, then at the end of a translatory movement substantially along the axis of said seat, this butterfly valve using a double sealing ring according to claims 1 or 3 located in an annular cavity formed in the region of said seat between a side face of the valve and a flange fixed to said side by screws.

11. A butterfly valve according to claim 10, and the seat of said valve also comprising a floating sealing ring support associated with the flange, the lower side of which constitutes the upper wall of the said annular cavity and the rear side of which cooperates with a sealing ring retained by the flange and, in a lower part, a ram the upper side of which constitutes the lower wall of said cavity.

12. A butterfly valve according to claim 10, said double sealing ring being located in a circular cavity provided in the edge of the butterfly member.

* * * * *